( 12 ) United States Patent
Samie et al.

(10) Patent No.: US 7,198,587 B2
(45) Date of Patent: Apr. 3, 2007

(54) TRANSMISSION WITH SELECTABLE BRAKING ONE-WAY CLUTCH

(75) Inventors: Farzad Samie, Franklin, MI (US); Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/736,930

(22) Filed: Dec. 16, 2003

(65) Prior Publication Data

US 2005/0130789 A1 Jun. 16, 2005

(51) Int. Cl.
F16H 3/44 (2006.01)

(52) U.S. Cl. ............... 475/285; 475/275; 475/292; 192/43.1; 192/44; 192/45

(58) Field of Classification Search ............... 475/275, 475/276, 277, 278, 281, 284, 285, 292; 192/37, 192/38, 43, 43.1, 44, 45, 4, 47; 188/82.2
See application file for complete search history.

(56) References Cited

U.S. PATENT DOCUMENTS

| | | | | |
|---|---|---|---|---|
| 4,347,763 A * | 9/1982 | Sakakibara et al. | ......... | 475/324 |
| 4,653,348 A * | 3/1987 | Hiraiwa | ...... | 475/276 |
| 5,025,902 A | 6/1991 | Imai et al. | ...... | 192/43 |
| 5,135,444 A * | 8/1992 | Hattori | ...... | 475/285 |
| 5,848,679 A * | 12/1998 | Saiko et al. | ...... | 192/37 |
| 6,053,839 A * | 4/2000 | Baldwin et al. | ...... | 475/281 |
| 6,139,463 A * | 10/2000 | Kasuya et al. | ...... | 475/275 |
| 6,244,965 B1 | 6/2001 | Klecker et al. | ...... | 464/81 |
| 6,361,468 B1 * | 3/2002 | Kato et al. | ...... | 475/344 |
| 6,398,684 B1 * | 6/2002 | Kaizu | ...... | 475/127 |
| 6,425,841 B1 * | 7/2002 | Haka | ...... | 475/275 |
| 6,652,407 B2 * | 11/2003 | Ronk et al. | ...... | 475/204 |
| 6,796,413 B2 * | 9/2004 | Fukui et al. | ...... | 192/42 |
| 6,802,795 B2 * | 10/2004 | Miyazaki et al. | ...... | 475/275 |
| 6,827,664 B2 * | 12/2004 | Stevenson et al. | ...... | 475/275 |
| 2004/0235601 A1 * | 11/2004 | Inuta | ...... | 475/120 |

FOREIGN PATENT DOCUMENTS

JP    04300442 A   * 10/1992

OTHER PUBLICATIONS

VDI-Berichte 1610.*
Trademarks Electronic Search Summary.*

* cited by examiner

Primary Examiner—David D. Le
(74) Attorney, Agent, or Firm—Kathryn A. Marra

(57) ABSTRACT

A multi-speed transmission is provided with a selectable (reversible) braking one-way clutch operative to brake rotation of a member of a planetary gear set of the transmission when the transmission is in reverse and first speed. First and second rotating input clutches are slipped when the vehicle is launched in reverse or first speed. The transmission is preferably characterized by the absence of a torque converter, but the invention may be implemented with a torque converter if desired.

20 Claims, 3 Drawing Sheets

| GEAR STATE | GEAR RATIO | RATIO STEP | C1234 CLUTCH (50) | CB26 CLUTCH (52) | C35R CLUTCH (54) | C456 CLUTCH (56) | SELECTABLE BRAKING ONE-WAY CLUTCH (58) |
|---|---|---|---|---|---|---|---|
| REV | 3.20 | | | | X | | X |
| N | -- | 0.79 | | | | | O |
| 1st | 4.06 | | X | | | | X |
| 2nd | 2.37 | 1.71 | X | X | | | |
| 3rd | 1.55 | 1.53 | X | | X | | |
| 4th | 1.16 | 1.34 | X | | | X | |
| 5th | 0.85 | 1.36 | | | X | X | |
| 6th | 0.67 | 1.27 | | X | | X | |
| OVERALL RATIO: | 6.03 | | | | | | |

US 7,198,587 B2

TRANSMISSION WITH SELECTABLE BRAKING ONE-WAY CLUTCH

TECHNICAL FIELD

The present invention relates to a transmission having a selectable braking one-way clutch which is engaged in first and reverse speeds, and having rotating input clutches that are slipped for launch in forward and reverse.

BACKGROUND OF THE INVENTION

Vehicle powertrains typically include a torque converter positioned between the engine and the transmission. The torque converter is a fluid coupling which allows the engine to spin while the vehicle wheels and transmission gears come to a stop. If the engine is rotating slowly, such as when the car is idling at a stop light, the amount of torque passed through the torque converter is very small, so the car may be kept still with light pressure on a brake pedal. As the engine accelerates, the torque converter pumps increased amounts of fluid, thereby causing increased amounts of torque to be transmitted to the wheels for launching the vehicle.

Manual transmission vehicles use a clutch, which completely disconnects the engine from the transmission, to allow the engine to run while the vehicle wheels and transmission gears are at rest. In order to launch the vehicle, the clutch is slipped and gradually engaged to connect the rotating engine output with the transmission input, thereby moving the wheels and launching the vehicle.

Automatic transmissions sometimes eliminate the torque converter and replace it with a flywheel and isolator to achieve a friction launch configuration. In a friction launch configuration, one or more clutches inside the transmission are slipped and gradually engaged to gradually transfer torque from the engine into the transmission for launch.

Some automatic transmissions include a low/reverse braking clutch and a freewheeler to provide reaction torque in both forward and reverse directions as input clutches are slipped for launching the vehicle without a torque converter.

SUMMARY OF THE INVENTION

The present invention provides a transmission having a selectable braking freewheeler engaged in first and reverse speeds, and rotating input clutches that are slipped for launch in the forward and reverse speeds. This configuration eliminates the prior art low/reverse braking clutch and freewheeler, thereby improving transmission costs, packaging, and mass. This configuration is particularly useful in a friction launch configuration, but benefits of the invention are also achieved when the configuration of the present invention is used with a torque converter.

More specifically, the invention provides a multi-speed transmission for a vehicle including an input shaft, an output shaft, and a plurality of planetary gear sets operatively connected between the input shaft and the output shaft. Each planetary gear set includes a ring gear member, a planet carrier assembly member, and a sun gear member. A selectable braking one-way clutch is operative to brake rotation of one of the members of the planetary gear sets when the transmission is in reverse and first speed. A first rotating input clutch is operatively engageable with the input shaft, and is slipped for launching the vehicle in first speed when the invention is implemented without a torque converter. A second rotating input clutch is operatively engageable with the input shaft, and is slipped for launching the vehicle in reverse.

The selectable braking one-way clutch is a reversible one-way clutch which is connected to the transmission housing. The selectable braking one-way clutch may be a selectable diode or a selectable roller clutch.

The selectable braking one-way clutch is actuated hydraulically by a piston and valve. The selectable braking one-way clutch is configured to freewheel in one rotational direction and to brake in an opposite rotational direction, and is selectably reversible to brake in said one rotational direction and freewheel in said opposite rotational direction, thereby facilitating use in the reverse and forward speeds.

The selectable braking one-way clutch is preferably connected between the planet carrier assembly member of the second planetary gear set and a transmission housing.

The first and second rotating input clutches are operatively engageable with the input shaft through one of the members of the planetary gear sets. Preferably, the input shaft is connected to a member of one of the planetary gear sets, and the first and second rotating input clutches are connected to another member of the planetary gear set to which the input shaft is connected. Preferably, the input shaft is connected to the ring gear member of the first planetary gear set, and the first and second rotating input clutches are connected to the planet carrier assembly member of the first planetary gear set.

A third clutch and a brake may also be provided. The first, second and third clutches, the brake, and the selectable braking one-way clutch may be engageable in combinations of two to provide six forward speed ratios and one reverse speed ratio between the input shaft and the output shaft.

The input shaft is preferably connected to the ring gear member of the first planetary gear set, and the output shaft is connected to the ring gear member of the third planetary gear set. The first clutch is operatively connected between the planet carrier assembly member of the first planetary gear set and the sun gear member of the third planetary gear set. The second clutch is operatively connected between the planet carrier assembly member of the first planetary gear set and the sun gear member of the second planet carrier assembly member. The third clutch is operatively connected between the ring gear member of the first planetary gear set and the planet carrier assembly member of the third planetary gear set. The brake is operatively connected between the transmission housing and the sun gear member of the first planetary gear set. The selectable braking one-way clutch is operatively between the planet carrier assembly member of the second planetary gear set and the transmission housing.

Again, the invention may be characterized by the absence of a torque converter, but the invention may be implemented with a torque converter, if desired.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENTS

Figures 1, 2:
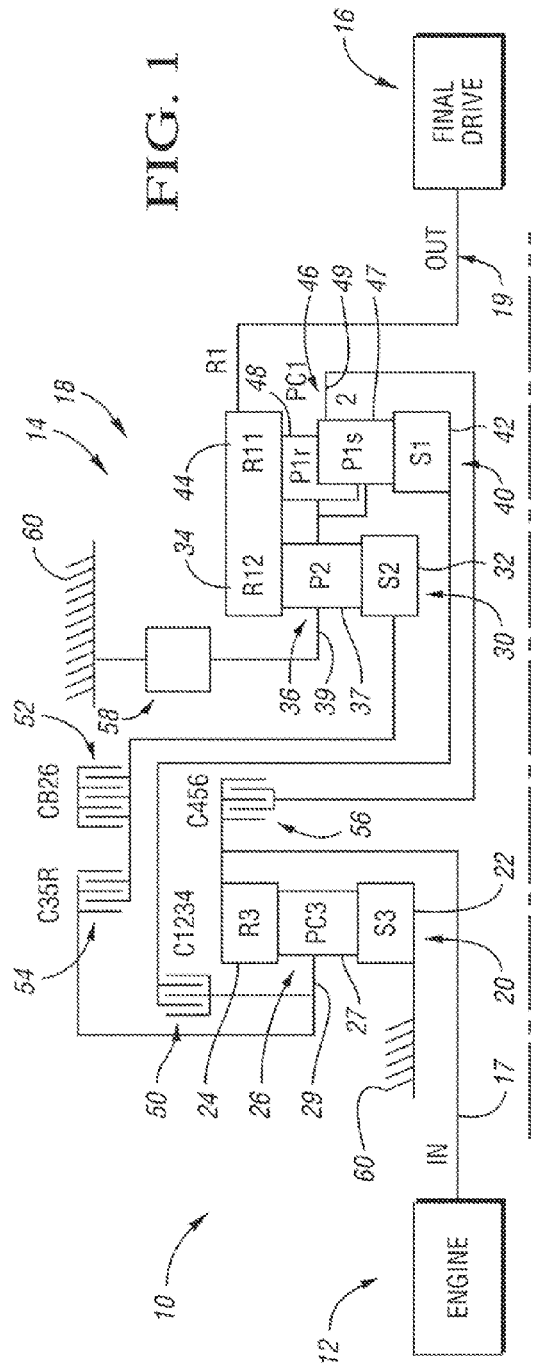
FIG. 1 shows a stick diagram of a transmission in accordance with the invention.
FIG. 2 shows a clutching table for use with the transmission of FIG. 1.

Referring to FIG. 1, a stick diagram of a powertrain 10 is shown in accordance with the invention. The powertrain includes an engine 12, a planetary transmission 14, and a conventional final drive mechanism 16.

The planetary transmission 14 includes an input shaft 17 continuously connected with the engine 12, a planetary gear arrangement 18, and a output shaft 19 continuously connected with the final drive mechanism 16. A torque converter may be positioned between the engine 12 and the input shaft 17. If no torque converter is present, then an isolator would be positioned between the engine 12 and the input shaft 17. The planetary gear arrangement 18 includes three planetary gear sets 20, 30 and 40.

The first planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The second planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring member 34.

The third planetary gear set 40 includes a sun gear member 42, a ring gear member 44, and a planet carrier assembly member 46. The planet carrier assembly member 46 includes a plurality of pinion gears 47, 48 rotatably mounted on a carrier member 49. The pinion gears 47 are disposed in meshing relationship with the sun gear member 42, and the pinion gears 48 are disposed in meshing relationship with the ring gear member 44. The ring gear member 34 is integral with the ring gear member 44. The third planetary gear set 40 is a compound planetary gear set.

The planetary gear arrangement also includes five torque transmitting mechanisms 50, 52, 54, 56 and 58. The torque transmitting mechanisms 50, 54, 56 are rotating type torque transmitting mechanisms, commonly termed clutches. The torque transmitting mechanism 52 is a stationary type torque transmitting mechanism, commonly termed brake or reaction clutch. The torque transmitting mechanism 58 is a selectable braking one-way clutch or diode.

The input shaft 17 is continuously connected with the ring gear member 24, and the output shaft 19 is continuously connected with the ring gear member 44. The planet carrier assembly member 26 is selectively connectable with the sun gear member 42 through the clutch 50. The sun gear member 32 is selectively connectable with the transmission housing 60 through the brake 52. The planet carrier assembly member 26 is selectively connectable with the sun gear member 32 through the clutch 54. The ring gear member 24 is selectively connectable with the planet carrier assembly member 46 through the clutch 56. The planet carrier assembly member 36 is selectively connectable with the transmission housing 60 through the braking one-way clutch 58.

As shown in the truth table or clutching table of FIG. 2, the torque transmitting mechanisms 50, 52, 54, 56 and 58 are selectively engaged in combinations of two to provide six forward speed ratios and a reverse speed ratio between the input shaft 17 and the output shaft 19.

The reverse speed ratio is established with the engagement of the clutch 54 and selectable braking one-way clutch 58. The numerical value of the reverse speed ratio is 3.20. The clutch 54 is slipped for launching the vehicle in reverse.

The first forward speed ratio is established with the engagement of the clutch 50 and the mechanical diode 58. The numerical value of the first forward speed ratio is 4.06. The clutch 50 is slipped for launching the vehicle in the forward direction.

The second forward speed ratio is established with the engagement of the clutch 50 and the brake 52. The numerical value of the second forward speed ratio is 2.37.

The third forward speed ratio is established with the engagement of the brakes 50, 54. The numerical value of the third forward speed ratio is 1.55.

The fourth forward speed ratio is established with the engagement of the clutches 50, 56. The numerical value of the fourth forward speed ratio is 1.16.

The fifth forward speed ratio is established with the engagement of the clutches 54, 56. The numerical value of the fifth forward speed ratio is 0.85.

The sixth forward speed ratio is established with the engagement of the brake 52 and clutch 56. The numerical value of the sixth forward speed ratio is 0.67.

As set forth above, the engagement schedule or clutching schedule for the torque transmitting mechanisms is shown in the truth table of FIG. 2. Also, the chart of FIG. 2 describes the ratio steps that are attained utilizing sample tooth ratios (not shown). For example, the step ratio between the first and second forward speed ratios is 1.71, while the step ratio between the reverse and first forward ratio is −0.79. It can also be readily determined from the truth table of FIG. 2 that all of the single step forward ratio interchanges are of the single transition variety, as are the double step forward ratio interchanges.

Figure 3:
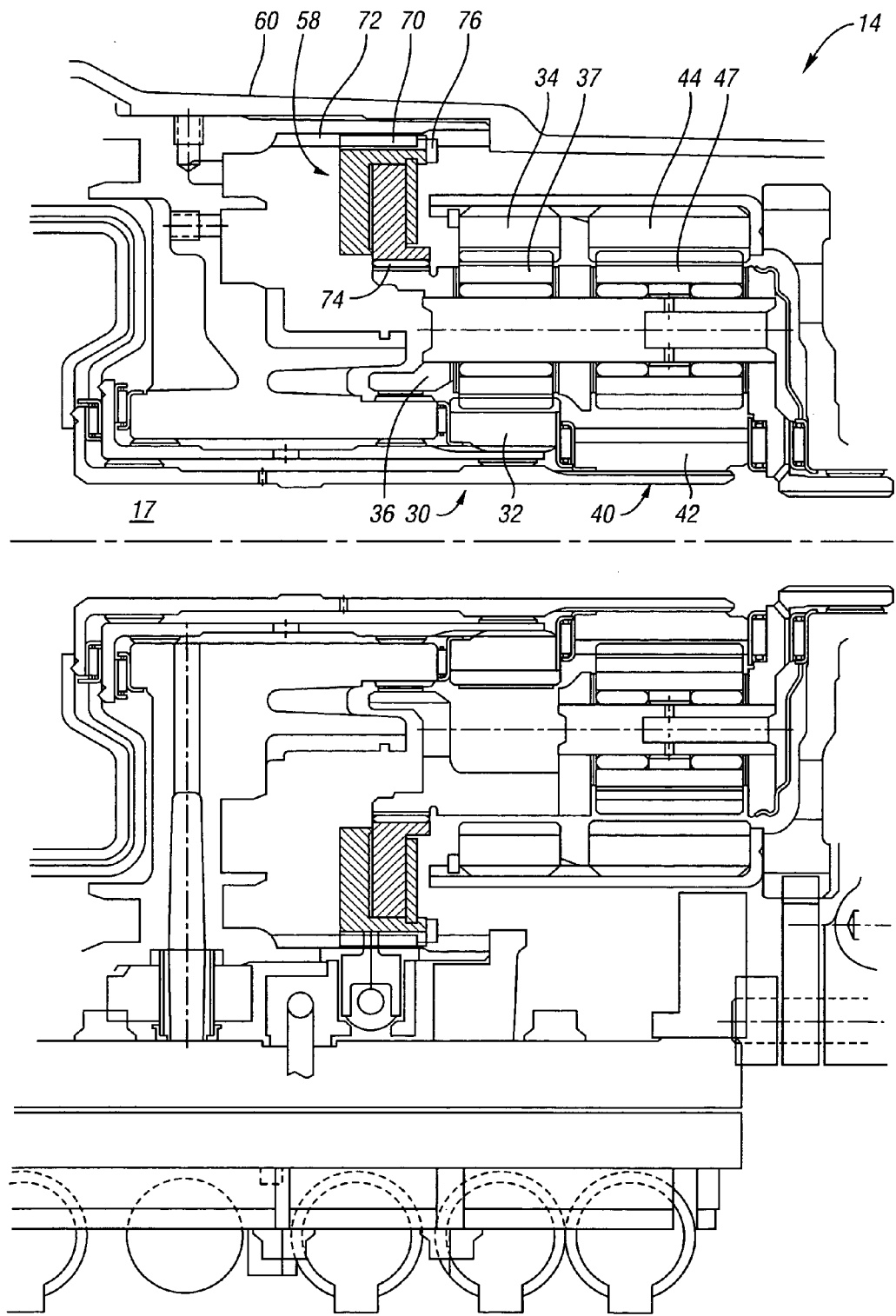
FIG. 3 shows a schematic partial cross-sectional side view of a transmission corresponding with the stick diagram of FIG. 1.

Referring to FIG. 3, a schematic partial cross-sectional view of a transmission 14 is shown corresponding with the stick diagram of FIG. 1. Like reference numerals are used to describe like components in the various figures.

As shown, the transmission 14 includes a transmission housing 60 enclosing planetary gear sets 30, 40 which rotate about a shaft 17. The position of the selectable braking on-way clutch 58 is shown in FIG. 3. The outer race 70 of the selectable braking on-way clutch 58 is splined to the spline 72 on the transmission housing 60. The inner race 74 of the selectable braking on-way clutch 58 is splined to the planet carrier assembly member 36. A snap ring 76 keeps the selectable braking on-way clutch 58 in place.

The selectable braking on-way clutch may be a controllable overrunning coupling or a bi-directional differential clutch. A controllable overrunning coupling (or selectable diode) is shown in U.S. Pat. No. 6,244,965, which is hereby incorporated by reference herein. A bi-directional differential clutch (or selectable roller clutch) is shown in U.S. Pat. No. 5,025,902, which is hereby incorporated by reference herein. The invention contemplates that other selectable (reversible) one-way clutches could be used as defined herein with the present invention.

Figure 4:
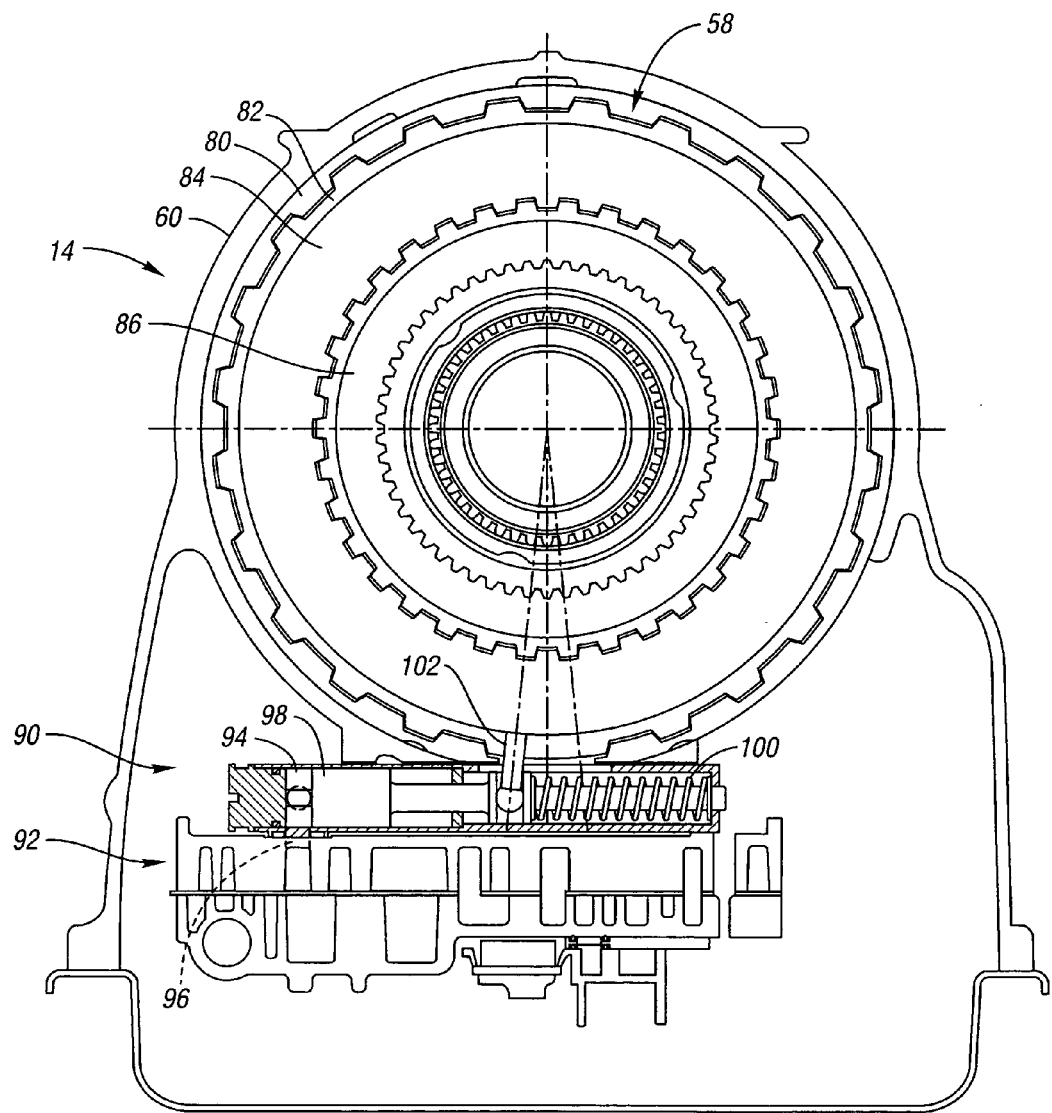
FIG. 4 shows a schematic vertical cross-sectional end view of a transmission incorporating a selectable braking one-way clutch, as shown in FIG. 3.

FIG. 4 shows a schematic vertical cross-sectional view of the transmission 14 incorporating the selectable braking on-way clutch 58. This selectable braking on-way clutch 58 may be identical in function to that described in U.S. Pat. No. 6,244,965, referenced above. As shown, this structure includes a grounding ring 80 which is connected to the transmission housing 60, a one-way clutch outer 82, a one-way clutch inner 84, and a carrier 86. The functionality of one-way clutches is described in detail in the above referenced patents. The selectable braking one-way clutch 58 is configured to freewheel in one rotational direction and to brake in an opposite rotational direction, and is selectively reversible to brake in said one rotational direction and freewheel in said opposite rotational direction, thereby facilitating use in the reverse and forward speeds.

The selectable braking one-way clutch 58 is actuated hydraulically by a piston and valve assembly 90. The piston and valve assembly 90 is positioned adjacent a valve body 92 and receives fluid from the valve body 92 into an apply chamber 94 through a channel 96 to actuate movement of the piston 98 against the spring 100. Movement of the piston 98 to the right, as viewed in FIG. 4, pivots the lever 102 to the right, and movement of the piston 98 to the left pivots the lever 102 to the left. The lever is operative to reverse the freewheeling direction of the selectable braking one-way clutch 58 as it is pivoted between the left and right positions by the piston 98.

In operation, the lever 102 is pivoted to the right when the transmission is in reverse, and pivoted to the left when the transmission is in first speed. Accordingly, the fail safe mode is the first speed mode because the spring 100 biases the lever 102 toward the first speed position in the event of a system failure.

Preferably, the piston and valve assembly 90 would be incorporated into the valve body 92 in a production configuration. The configuration shown in FIG. 4 is merely a prototype.

The lever 102 is connected to a selector plate which controls the selected rotational torque engagement direction of the selectable braking on-way clutch 58, as illustrated in the above-referenced patents. During all modes of operation except for reverse, the selector plate is in forward mode and in first gear the selectable braking on-way clutch is holding the reaction torque. When the transmission shifts to second gear, the selectable braking on-way clutch 58 will overrun, and thus the 1-2 shift becomes a freewheeler shift. The selector plate is also in forward mode with the transmission in neutral and park. When the transmission manual valve is moved from park, neutral or drive to reverse mode, the selectable braking on-way clutch selector plate is moved into reverse position when the selectable braking on-way clutch is unloaded. Because the selectable braking on-way clutch is connected to the transmission housing 60, the selectable braking on-way clutch 58 provides reaction torque in both forward and reverse directions as the input clutches 50 or 52 are slipped during launch.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission for a vehicle comprising:
   an input shaft;
   an output shaft;
   a plurality of planetary gear sets operatively connected between the input shaft and output shaft, each having a ring gear member, a planet carrier assembly member and a sun gear member;
   a selectable braking one-way clutch for braking rotation of one of said members of said planetary gear sets when the transmission is in reverse and first speeds;
   a first rotating input clutch operatively engageable with one of said planetary gear sets which is directly connected with said input shaft for enabling the input shaft to carry torque into the transmission, wherein said first rotating input clutch is slipped for launching the vehicle in first speed;
   a second rotating input clutch operatively engageable with said one of said planetary gear sets which is directly connected with said input shaft for enabling the input shaft to carry torque into the transmission, wherein said second rotating input clutch is slipped for launching the vehicle in reverse; and
   wherein the transmission is characterized by the absence of a torque converter.

2. The multi-speed transmission of claim 1, wherein said first and second rotating input clutches are operatively engageable with the input shaft through one of said members of said planetary gear sets.

3. The multi-speed transmission of claim 1, wherein said selectable braking one-way clutch is connected between the planet carrier assembly member of a second of said plurality of planetary gear sets, and a transmission housing.

4. The multi-speed transmission of claim 1, wherein said selectable braking one-way clutch is hydraulically actuated by a piston and valve.

5. The multi-speed transmission of claim 1, wherein said selectable braking one-way clutch is configured to freewheel in one rotational direction and to brake in an opposite rotational direction, and is selectably reversible to brake in said one rotational direction and freewheel in said opposite rotational direction, thereby facilitating use in said reverse and forward speeds.

6. The multi-speed transmission of claim 1, wherein said selectable braking one-way clutch is a controllable overrunning coupling.

7. The multi-speed transmission of claim 1, wherein said selectable braking one-way clutch is a bi-directional differential clutch.

8. The multi-speed transmission of claim 1, wherein said input shaft is connected to a member of one of said planetary gear sets, and said first and second rotating input clutches are connected to said one of said planetary gear sets.

9. The multi-speed transmission of claim 8, wherein said input shaft is connected to the ring gear member of a first of said plurality of planetary gear sets, and said first and second rotating input clutches are connected to the planet carrier assembly member of the first planetary gear set.

10. The multi-speed transmission of claim 1, further comprising a third clutch and a brake, and wherein said first, second and third clutches, said brake and said selectable braking one-way clutch are engageable in combinations of two to provide six forward speed ratios and one reverse speed ratio between the input shaft and the output shaft.

11. The multi-speed transmission of claim 10, wherein:
   said input shaft is connected to said ring gear member of a first of said plurality of planetary gear sets;
   said output shaft is connected to said ring gear member of a third of said plurality of planetary gear sets;
   said first clutch is operatively connected between said planet carrier assembly member of the first planetary gear set and said sun gear member of the third planetary gear set;
   said second clutch is operatively connected between said planet carrier assembly member of the first planetary gear set and said sun gear member of a second of said plurality of planetary gear sets;

said third clutch is operatively connected between the ring gear member of the first planetary gear set and said planet carrier assembly member of the third planetary gear set;

said brake being operatively connected between a transmission housing and said sun gear member of the second planetary gear set; and said selectable braking one-way clutch being operatively connected between said planet carrier assembly member of the second planetary gear set and said transmission housing.

12. A multi-speed transmission for a vehicle comprising:
an input shaft;
an output shaft;
a plurality of planetary gear sets operatively connected between the input shaft and output shaft, each having a ring gear member, a planet carrier assembly member and a sun gear member;
a selectable reversible braking one-way clutch for braking rotation of one of said members of said planetary gear sets when the transmission is in reverse and first speeds, and disengaged in all other gear states; and
wherein said selectable braking one-way clutch is configured to freewheel in one rotational direction and to brake in an opposite rotational direction, and is selectably reversible to brake in said one rotational direction and freewheel in said opposite rotational direction, thereby facilitating use in said reverse and first speeds; and wherein the transmission is characterized by the absence of a torque converter.

13. The multi-speed transmission of claim 12, further comprising:
a first rotating input clutch operatively engageable with one of said planetary gear sets which is directly connected with said input shaft for enabling the input shaft to carry torque into the transmission, wherein said first rotating input clutch is slipped for launching the vehicle in first speed;
a second rotating input clutch operatively engageable with said one of said planetary gear sets which is directly connected with said input shaft for enabling the input shaft to carry torque into the transmission, wherein said second rotating input clutch is slipped for launching the vehicle in reverse.

14. The multi-speed transmission of claim 13, wherein said first and second rotating input clutches are operatively engageable with the input shaft through one of said members of said planetary gear sets.

15. The multi-speed transmission of claim 13, wherein said selectable braking one-way clutch is connected between the planet carrier assembly member of a second of said plurality of planetary gear sets and a transmission housing.

16. The multi-speed transmission of claim 13, wherein said selectable braking one-way clutch is hydraulically actuated by a piston and valve.

17. The multi-speed transmission of claim 13, further comprising a third clutch and a brake, and wherein said first, second and third clutches, said brake and said selectable braking one-way clutch are engageable in combinations of two to provide six forward speed ratios and one reverse speed ratio between the input shaft and the output shaft.

18. The multi-speed transmission of claim 13, wherein said input shaft is connected to a member of one of said planetary gear sets, and said first and second rotating input clutches are connected to said one of said planetary gear sets.

19. The multi-speed transmission of claim 18, wherein said input shaft is connected to the ring gear member of the first planetary gear set, and said first and second rotating input clutches are connected to the planet carrier assembly member of a first of said plurality of planetary gear sets.

20. A multi-speed transmission for a vehicle comprising:
an input shaft;
an output shaft;
a plurality of planetary gear sets operatively connected between the input shaft and output shaft, each having a ring gear member, a planet carrier assembly member and a sun gear member;
a selectable braking one-way clutch for braking rotation of one of said members of said planetary gear sets when the transmission is in reverse and first speeds;
a first rotating input clutch operatively engageable with one of said planetary gear sets which is directly connected with said input shaft for enabling the input shaft to carry torque into the transmission, wherein said first rotating input clutch is slipped for launching the vehicle in first speed;
a second rotating input clutch operatively engageable with said one of said planetary gear sets which is directly connected with said input shaft for enabling the input shaft to carry torque into the transmission, wherein said second rotating input clutch is slipped for launching the vehicle in reverse;
a third clutch and a brake, and wherein said first, second and third clutches, said brake and said selectable braking one-way clutch are engageable in combinations of two to provide six forward speed ratios and one reverse speed ratio between the input shaft and the output shaft; and
wherein the transmission is characterized by the absence of a torque converter.

* * * * *